(12) United States Patent
Tagami et al.

(10) Patent No.: US 8,643,970 B2
(45) Date of Patent: Feb. 4, 2014

(54) MAGNETIC RECORDING APPARATUS AND RECORDING METHOD OF MAGNETIC RECORDING APPARATUS

(75) Inventors: Naoki Tagami, Ome (JP); Kazuto Kashiwagi, Ome (JP); Akihiro Itakura, Kawasaki (JP); Haruhiko Izumi, Ome (JP); Masatoshi Sakurai, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 88 days.

(21) Appl. No.: 13/357,444

(22) Filed: Jan. 24, 2012

(65) Prior Publication Data

US 2012/0194937 A1    Aug. 2, 2012

(30) Foreign Application Priority Data

Jan. 31, 2011    (JP) .................................. 2011-019246

(51) Int. Cl.
*G11B 5/02*    (2006.01)
(52) U.S. Cl.
USPC ..................... 360/55; 360/48; 360/40; 360/61
(58) Field of Classification Search
None
See application file for complete search history.

(56) References Cited

U.S. PATENT DOCUMENTS 7,599,145 B2 *   10/2009   Ishiguro ..................... 360/78.05
2010/0226036 A1 *   9/2010   Ozawa ............................ 360/75

FOREIGN PATENT DOCUMENTS

| JP | 2002-029082 | 1/2002 |
| JP | 2009-129528 | 6/2009 |
| JP | 2009-208362 | 9/2009 |
| JP | 2009-223962 | 10/2009 |
| JP | 2010-205330 | 9/2010 |

* cited by examiner

*Primary Examiner* — Muhammad N Edun
(74) *Attorney, Agent, or Firm* — Patterson & Sheridan LLP

(57) ABSTRACT

According to one embodiment, a magnetic recording apparatus configured to record information onto a magnetic recording medium by a shingled write recording method, the magnetic recording apparatus includes: a recording head configured to cover a plurality of dot arrays and an end portion of which is situated at one dot array of a recording target; an actuator configured to move the recording head by one array after the recording to one dot array by the recording head; and a controller configured to perform recording compensation of the magnetic dot based on prestored recording data of a peripheral dot of a magnetic dot when input user data is recorded to the magnetic dot.

12 Claims, 5 Drawing Sheets

DOT ARRANGEMENT AND RECORDING METHOD

CONCEPTUAL VIEW OF CORRECTION METHOD

DOT ARRANGEMENT AND RECORDING METHOD

DC ERASE AT THE START OF RECORDING

ORIENTATION OF MAGNETIZATION OF DOT TO WHICH RECORDING
IS PERFORMED AND ORIENTATION OF MAGNETIC FIELD RECEIVED
FROM PERIPHERAL DOTS ARE PARALLEL TO EACH OTHER

ORIENTATION OF MAGNETIZATION OF DOT TO WHICH RECORDING IS
PERFORMED AND ORIENTATION OF MAGNETIC FIELD RECEIVED
FROM PERIPHERAL DOTS ARE OPPOSITE TO EACH OTHER

FIG. 7

| PERIPHERAL DOT MAGNETIZATION DIRECTION | | CORRECTION AMOUNT | |
|---|---|---|---|
| UPWARD MAGNETIZATION | DOWNWARD MAGNETIZATION | MAGNETIZATION OF DOT TO WHICH RECORDING IS PERFORMED IS DOWNWARD | MAGNETIZATION OF DOT TO WHICH RECORDING IS PERFORMED IS UPWARD |
| 0 | 6 | 4t | −4t |
| 1 | 5 | 2t | −2t |
| 2 | 4 | t | −t |
| 3 | 3 | 0 | 0 |
| 4 | 2 | −t | t |
| 5 | 1 | −2t | 2t |
| 6 | 0 | −4t | 4t |

MAGNETIC RECORDING APPARATUS AND RECORDING METHOD OF MAGNETIC RECORDING APPARATUS

CROSS REFERENCE TO RELATED APPLICATION(S)

The application is based upon and claims the benefit of priority from Japanese Patent Application No. 2011-019246 filed on Jan. 31, 2011, the entire contents of which are incorporated herein by reference.

BACKGROUND

1. Field

An embodiment of the present invention relates to a magnetic recording apparatus and a recording method thereof.

2. Description of the Related Art

There is a demand that the recording density be increased in information recording apparatuses. To increase the recording density, it is necessary to micrify the size of one recording bit or recording mark which is a writing unit of recording on recording media. However, in conventional recording media, the micrification faces significant difficulties. For this reason, as a technology to increase the recording density, bit patterned media (BPM) (also referred to merely as patterned media) have been proposed in which the recording material is previously divided by a non-recording material and recording and reproduction are performed with a single recording material particle as a single recording bit.

The bit patterned media include magnetic dot arrays in which magnetic dots on a nanometer scale are regularly arranged on a substrate, and a digital signal of "0" or "1" (one dot corresponds to one bit) is recorded by the orientation of the magnetization of each magnetic dot.

However, the magnetic dots are divided by a non-recording material, and when the recording head writes data onto the recording medium, it is necessary to accurately write data to each magnetic dot, so that it is necessary to adjust the recording timing of the recording head. If the difference in timing is large, recording errors increase.

The dot arrangement patterns of the bit-patterned media include a lattice (square) pattern and a staggered pattern. In the lattice pattern where the dots are longitudinally and laterally aligned, considering a dot array as one track of data, precise constraint conditions are required as conditions in the cross track direction such as the head core width and tracking.

As a solution thereto, the staggered pattern is under study. In the staggered pattern, in a multiplicity of dot arrays arranged with regular dot pitches, the phases of the odd-numbered dot arrays and the even-numbered dot arrays are shifted by 180 degrees. When the head performs recording or reproduction with two dot arrays as the simultaneously accessible width, in the staggered pattern, the track pitch is doubled, so that the conditions in the cross track direction such as the head core width and tracking are relaxed. On the other hand, since one of the elements that determine the write phase margin is the center distance between dots (dot pitch), in the staggered pattern with two dot arrays as one data track, the dot pitch is halved, so that the write phase margin is decreased. Moreover, this makes strict the precision required of the manufacture of disks and heads.

Accordingly, to enlarge the write phase margin, it is considered to perform so-called shingled write recording in which recording is performed to one dot array while the head is moved in the cross track direction.

On the contrary, a method is available in which the correction amount of the phase of the magnetic field is obtained from preset information or by a calculation and the phase of the write magnetic field is adjusted by the obtained correction amount of the phase of the write magnetic field.

BRIEF DESCRIPTION OF THE DRAWINGS

A general configuration that implements the various features of embodiments will be described with reference to the drawings. The drawings and the associated descriptions are provided to illustrate embodiments and not to limit the scope of the embodiments.

FIG. 7 is a view showing a peripheral dot magnetization pattern and a correction amount used in the embodiment;

DETAILED DESCRIPTION

Hereinafter, an embodiment of the present invention will be described.

A first embodiment of the present invention will be described with reference to FIGS. 1 to 8.

Figure 8:
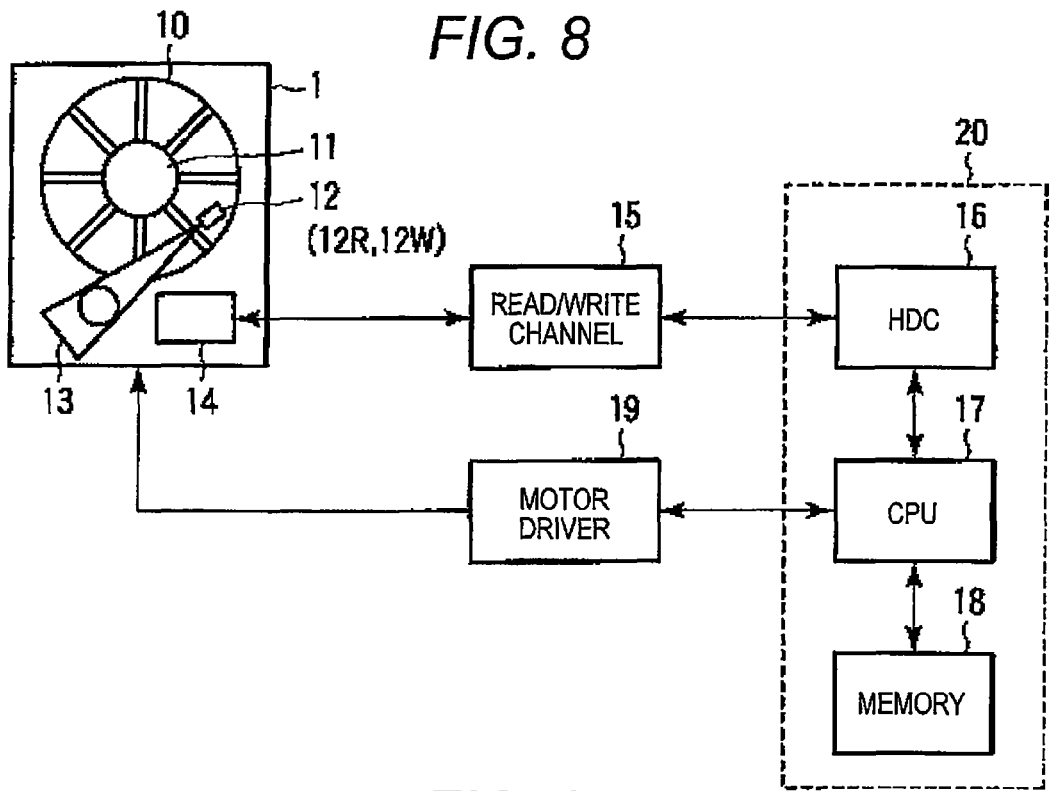
FIG. 8 is a block diagram showing the structure of a magnetic recording apparatus related to the embodiment.

First, FIG. 8 is a block diagram showing the structure of a magnetic recording apparatus related to the embodiment.

A disk drive 1 has a disk 10 as a magnetic recording medium, a spindle motor (SPM) 11 that rotates the disk 10, a head 12, an actuator 13, and a head amplifier unit (head IC) 14. The disk 10 is a bit patterned medium including magnetic dot arrays in which minute magnets (magnetic dots) on a nanometer scale are regularly arranged on a substrate, and where a digital signal of "0" or "1" (one dot corresponds to one bit) is recorded by the orientation of the magnetization of each magnetic dot.

The head 12 has a structure in which a read head element 12R and a write head element 12W are mounted on one slider so as to be separated from each other. The read head element 12R reads the data recorded on the disk 10. The write head 12W writes data onto the disk 10. The actuator 13 has a suspension provided with the head 12, an arm, and a voice coil motor (VCM), and moves the head 12 in the radial direction (cross track direction) on the disk 10 for tracking control.

The head amplifier unit 14 includes a read amplifier that amplifies the read signal read by the read head element 12R of the head 12 and outputs it to a read/write channel 15. Moreover, the head amplifier unit 14 includes a write driver that converts the write data outputted from the read/write channel 15 into a write signal (write current) and supplies it to the write head element 12W of the head 12.

The disk drive 1 includes the read/write channel 15 mounted on a printed circuit board, a hard disk controller (HDC) 16, a microprocessor (CPU) 17, a memory 18, and a motor driver 19. The HDC 16, the CPU 17, and the memory 18 are mounted on a one-chip integrated circuit 20.

The read/write channel 15 is a signal processing unit that processes a read/write data signal. The HDC 16 constitutes an interface with the disk drive 1 and a non-illustrated host system (a personal computer or a digital apparatus), and controls the data transfer control and the read/write operation. The CPU 17 is a main controller of the disk drive 1, and executes the head positioning control (servo control) and the read/write data rearrangement. The memory 18 is a flash EEPROM.

The motor driver 19 has a SPM driver that supplies driving current to the SPM 11 and a VCM driver that supplies driving current to the VCM of the actuator 13. The VCM driver supplies driving current to the VCM of the actuator 13 according to a head positioning control (servo control) signal of the CPU 17, and controls the movement of the head 12 in the radial direction on the disk 10.

Next, a magnetic recording medium and a magnetic recording method related to the embodiment will be described.

In the bit patterned media, since the recording bits are previously arranged on the disk, the synchronization of the write magnetic field with the magnetic dots is important at the time of writing. A method proposed to enlarge the write phase margin will be described with reference to FIG. 2. In this example, the dot phase of four arrays is shown. First, data is recorded under a condition where the edge portion of the write head is situated at the dot array 1. At this time, recording is performed with a write frequency corresponding to the dot pitch in the dot arrays. At this time, since the recording period can be made twice as long as that when recording is performed with two dot arrays as one track, the write phase margin can be made larger than that in the conventional art. Then, data is recorded to the dot array 2. The write phase at this time is adjusted to the phase of the dots of the dot array 2. When recording is performed to dot arrays with a large write head core width, although recording is simultaneously performed to a plurality of dot arrays (in the figure, the dot arrays 2 and 3), no problem occurs since the edge portion of the write head is used and the dot arrays are successively overwritten when recording is performed to the next dot arrays. Recording to the arrays 3 and 4 is performed like shingling while similar control is shifted one dot array at a time (hereinafter, referred to as shingled write recording). When the data recorded in this manner is reproduced, two arrays are simultaneously reproduced as described later. The reproduction waveform at that time can be detected by a conventional signal processing method since the peaks do not coincide with each other as in the conventional art because of the presence of a phase difference among the dots in the simultaneously reproduced dot arrays.

In the bit patterned media, it is important that recording be performed by a recording head with a correct recording magnetic field synchronized with the magnetic dot. However, even when recording to the dots is performed by applying the same recording magnetic field, the recording magnetic field necessary for the magnetization reversal of the dots to which recording is performed varies according to the orientation of the magnetization of the dot to which recording is performed from now and its peripheral dots. In a recording apparatus that records arbitrary data, since the recording data (the orientation of the magnetization) of the dot to which recording is performed and its peripheral dots arbitrarily changes, the probability of occurrence of recording errors increases, which becomes a factor that deteriorates the write phase margin.

Figure 1:
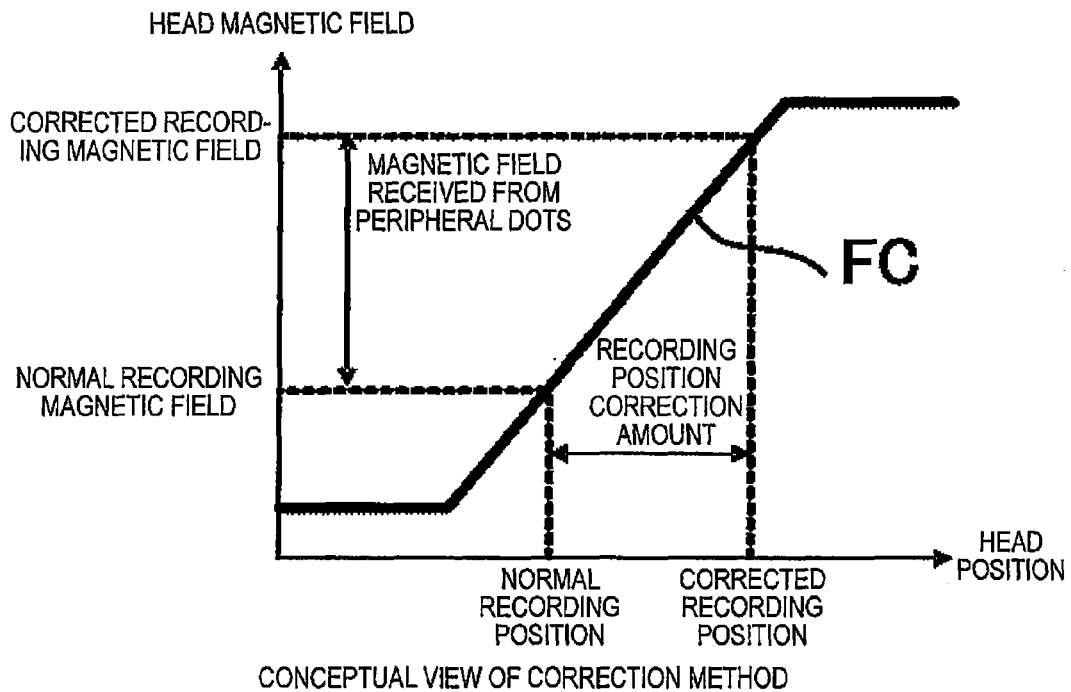
FIG. 1 is a conceptual view of a magnetic field correction method showing an embodiment of the present invention.

Therefore, the recording data (the orientation of the magnetization) of the dot to which recording is performed and its peripheral dots is stored, and as shown in FIG. 1, the peripheral magnetic field received by the dots is converted into a recording position correction amount to perform synchronization recording correction. That is, FIG. 1 is a conceptual view of a magnetic field correction method showing the embodiment, the horizontal axis represents the head position, and the vertical axis represents the head magnetic field. Since the head magnetic field intensity has a gradient with respect to the head position, the magnetic field intensity can be changed by changing the recording position. For example, it is indicated that when it is necessary to make the corrected recording magnetic field higher than the normal recording magnetic field by the magnitude of the magnetic field received from the peripheral dots, the corrected recording position is made earlier in the head position than the normal recording position by the corresponding recording position correction amount.

Figure 2:
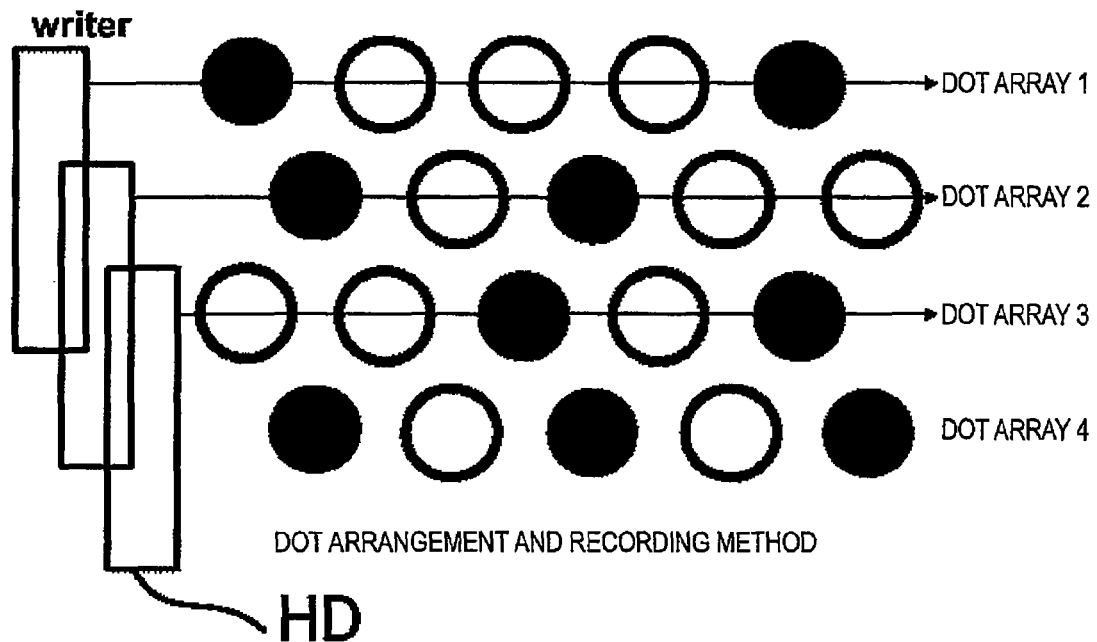
FIG. 2 is a view showing a dot arrangement and a recording method used in the embodiment.
Figure 3:
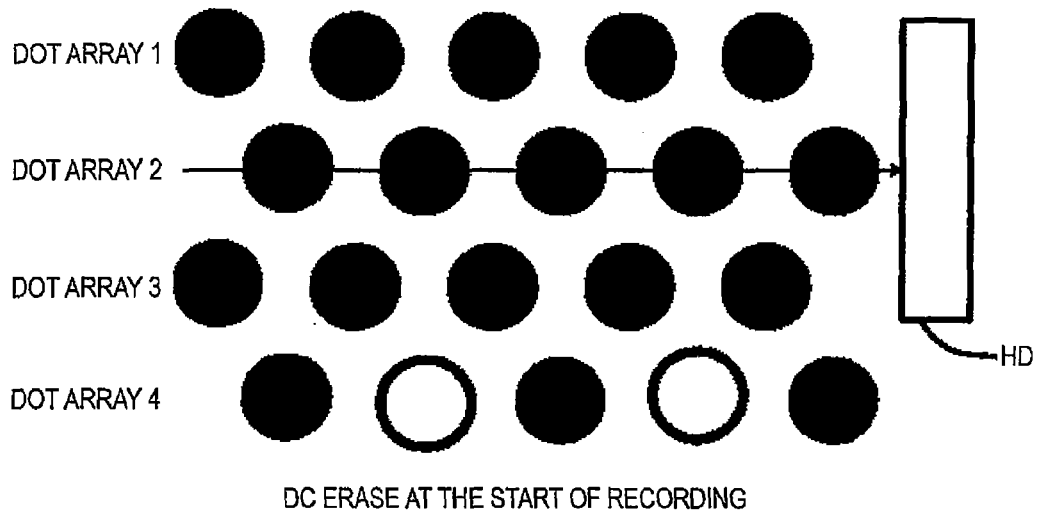
FIG. 3 is a view shown to explain that DC erase is performed at the start of recording in the embodiment.

FIG. 2 shows a dot arrangement and a recording method used in the present embodiment. FIG. 3 is a view shown to explain that DC erase is performed at the start of recording in the embodiment. When the magnetization condition of each dot array is not stored at the start of recording, the magnetization orientations of two or more dot arrays are made the same by DC erase as in FIG. 3, or two dot arrays are simultaneously reproduced and the magnetization conditions of the dot arrays are stored, whereby the initial peripheral dot data is grasped. The recording thereafter is performed while shifting from the dot array 1 to the dot arrays 2, 3 and 4 of FIG. 2 in order as described above. In the shingled write recording, since the width of the recording head is wide and recording is performed over a plurality of dot arrays while successively shifting to the dot arrays, the magnetization condition of the dot to which recording is performed and its peripheral six dots can be grasped by storing the recording data of the adjacent dot array to which recording has already been performed. While this applies to the other figures, the black dots represent "0" and the hollow dots represent "1".

Figure 4:
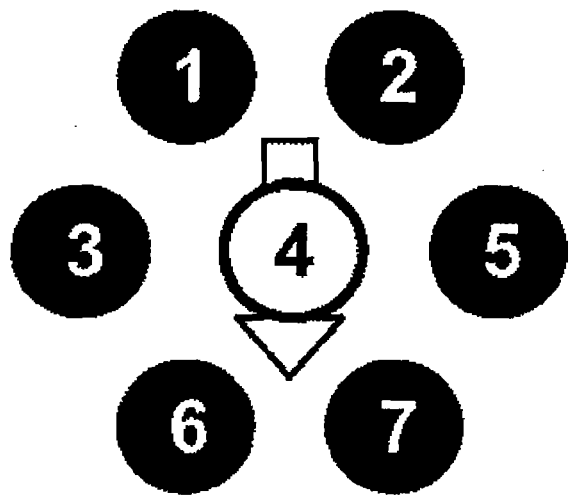
FIG. 4 is a view 1 shown to explain the influence of the magnetic field of peripheral dots in the embodiment.

The influence on the recording dot differs according to the orientation of the magnetization of the dot to which recording is performed and the orientation of the magnetic field received from the peripheral dots. FIG. 4 is a view shown to explain the influence of the magnetic field of the peripheral dots in the present embodiment. When the orientation of the magnetization of the recording dot 4 before recording and the orientation of the magnetic field received from the peripheral dots are the same as in FIG. 4, the recording magnetic field necessary for magnetization reversal is large.

Figure 5:
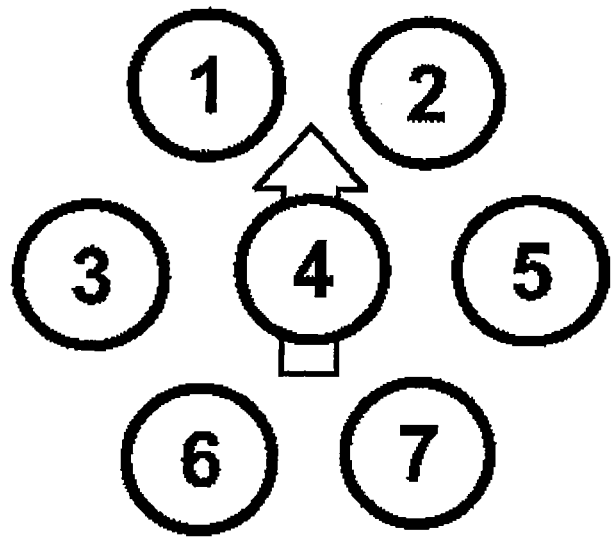
FIG. 5 is a view 2 shown to explain the influence of the magnetic field of peripheral dots in the embodiment.

On the other hand, FIG. 5 is another view shown to explain the influence of the magnetic field of the peripheral dots in the present embodiment. When the orientation of the magnetization of the recording dot 4 before recording and the orientation of the magnetic field received from the peripheral dots are opposite to each other as in FIG. 5, the magnetic field necessary for magnetization reversal is small. As shown in FIG. 1, the recording magnetic field applied from the head has an inclination, and by adjusting the timing, the intensity of the recording magnetic field is changed. Therefore, under the recording dot condition where the magnetic field necessary for recording is large as in FIG. 4, a correction is performed to hasten the recording timing and raise the recording magnetic field as in FIG. 6A. Under the recording dot condition where the magnetic field necessary for magnetization reversal is small as in FIG. 5, a correction is performed to delay the recording timing as in FIG. 6B. While this applies to the previous figures, HD represents the head, and FC represents the curve of the magnetic field intensity.

Figures 6A, 6B:
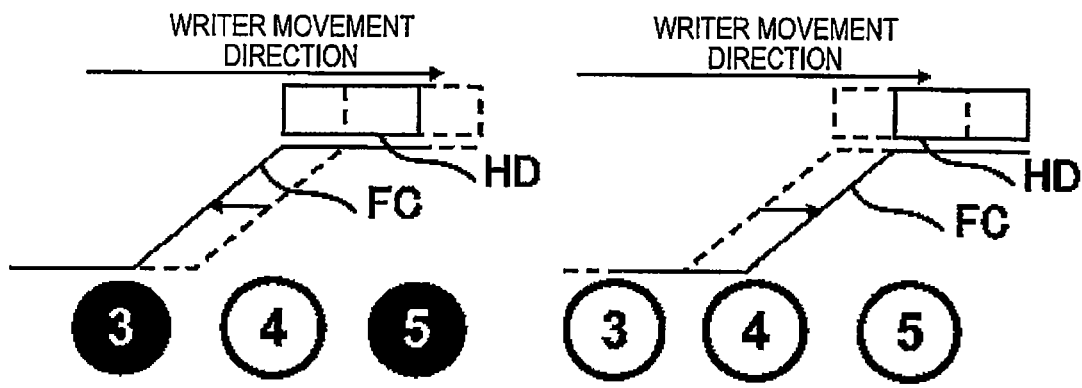
FIGS. 6A and 6B are explanatory views showing a correction method by the recording timing in the embodiment.

While FIGS. 6A and 6B are explanatory views showing a correction method by the recording timing in the embodiment, the correction of the recording magnetic field may be realized by a different method. For example, adjustment may be made by the magnitude of the current flown through the write head, or adjustment may be made by shifting in the cross track direction.

FIG. 7 is a schematic view showing a peripheral dot magnetization pattern and a correction amount used in the embodiment. It is expressed that the recording position is shifted by an integral multiple of a time unit t in response to the peripheral dot magnetization direction and the intensity thereof.

Figure 9:
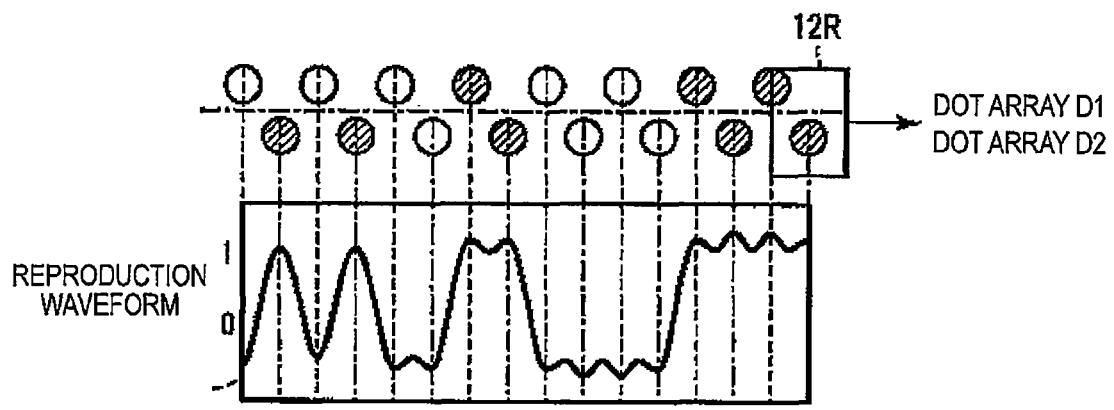
FIG. 9 is a view showing the state of reproduction related to the embodiment.

Next, referring to FIG. 9, a reproduction method in the embodiment will be described. While in recording, the write head element 12W is tracking-controlled in such a way that the rear end portion (edge) in the cross track direction covers a dot array as shown in FIG. 2, the read head element 12R has a width that can simultaneously access a plurality of dot arrays, for example, two dot arrays as shown in FIG. 9, and in reproduction, the read head element 12R is tracking-controlled in such a way that the center in the direction of the width is situated at the center of the two dot arrays. Since the phases of two dot arrays are shifted from each other by 180 degrees, data can be alternately read from two dot arrays by the read head element 12R having the width that can simultaneously access two dot arrays. When 00010011 . . . is recorded in the first dot array and 11010011 . . . is recorded in the second dot array, the reproduced data is 0101001100001111 . . . .

The present embodiment is also applicable to a case where shingled write recording is performed onto continuous media. This case corresponds to a structure when the magnetic dot becomes large enough to touch an adjacent magnetic dot.

For the structure in which shingled write recording is performed to dots in the staggered pattern as described above, in the embodiment, recording errors caused by the magnetic field received from the peripheral dots are suppressed, so that the write phase margin can be increased.

Generally, the method for shingled write recording onto staggered-pattern bit patterned media enables the enlargement of the write phase margin and the relief of the dot precision. By performing recording compensation responsive to the peripheral magnetic field influence on this method, a method is realized that enables further margin enlargement and dot precision relief.

As an effect of the embodiment, when shingled write recording is performed to dots in the staggered pattern, at the time of reproduction, the transfer rate is improved by the simultaneous reproduction of a plurality of dot arrays, and as described above, by changing the order of data at the time of recording so that the data can be read in order at the time of reproduction, the transfer rate deterioration at the time of reproduction can be suppressed.

The present invention is not limited to the above-described embodiment, but may be carried out in the form of various modifications without departing from the gist of the invention. For example, adequate effects are predicted even if the media are not bit patterned media, the arrangement is not the staggered arrangement or the recording is not the shingled write recording.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A magnetic recording apparatus configured to record information onto a magnetic recording medium by a shingled write recording method, the magnetic recording apparatus comprising:
   a recording head configured to cover a plurality of dot arrays and an end portion of which is situated at one dot array of a recording target;
   an actuator configured to move the recording head by one dot array after the recording head records data to one of the plurality of dot arrays; and
   a controller configured to perform recording compensation for a magnetic dot based on at least prestored recording data of a dot peripheral to the magnetic dot, when data is recorded to the magnetic dot,
   wherein the controller performs the recording compensation by correcting a reversal timing of a recording current or an intensity of the recording current.

2. The magnetic recording apparatus according to claim 1, wherein
   when the recording data of the peripheral dot is not yet recorded, the controller performs data acquisition by reproduction.

3. The magnetic recording apparatus according to claim 1, wherein
   when the recording data of the peripheral dot is not yet recorded, the controller performs DC erase.

4. A magnetic recording method for recording information onto a magnetic recording medium, the method comprising:
   prestoring recording data of a dot peripheral to a magnetic dot; and
   performing recording compensation for the magnetic dot based on at least the prestored recording data, when data is recorded to the magnetic dot,
   wherein the recording compensation is performed by correcting a reversal timing of a recording current or an intensity of the recording current.

5. The magnetic recording method according to claim 4, wherein data acquisition is performed by reproduction when the recording data of the peripheral dot is not yet recorded.

6. The magnetic recording method according to claim 4, wherein DC erase is performed when the recording data of the peripheral dot is not yet recorded.

7. A magnetic recording apparatus configured to record information onto a magnetic recording medium by a shingled write recording method, the magnetic recording apparatus comprising:
   a recording head configured to cover a plurality of dot arrays and an end portion of which is situated at one dot array of a recording target;
   an actuator configured to move the recording head by one dot array after the recording head records data to one of the plurality of dot arrays; and
   a controller configured to perform recording compensation for a magnetic dot based on at least a polarity of prestored recording data of a dot peripheral to the magnetic dot, when data is recorded to the magnetic dot.

8. The magnetic recording apparatus according to claim 7, wherein the controller performs the recording compensation by correcting the reversal timing of a recording current or an intensity of the recording current.

9. The magnetic recording apparatus according to claim 8 wherein, when the recording data of the peripheral dot is not yet recorded, the controller performs data acquisition by reproduction.

10. The magnetic recording apparatus according to claim 8, wherein, when the recording data of the peripheral dot is not yet recorded, the controller performs DC erase.

11. The magnetic recording apparatus according to claim 7, wherein, when the recording data of the peripheral dot is not yet recorded, the controller performs data acquisition by reproduction.

12. The magnetic recording apparatus according to claim 7, wherein, when the recording data of the peripheral dot is not yet recorded, the controller performs DC erase.

* * * * *